Sept. 20, 1955        J. A. CONNOR        2,718,617
ADJUSTABLE TEMPERATURE COEFFICIENT CAPACITOR
Filed May 17, 1951        2 Sheets-Sheet 1
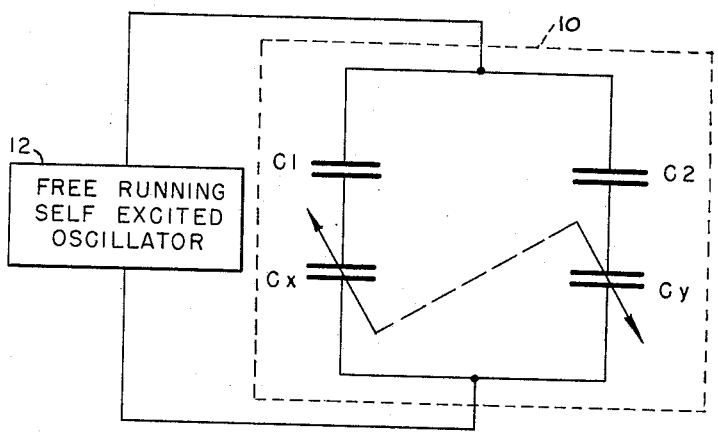
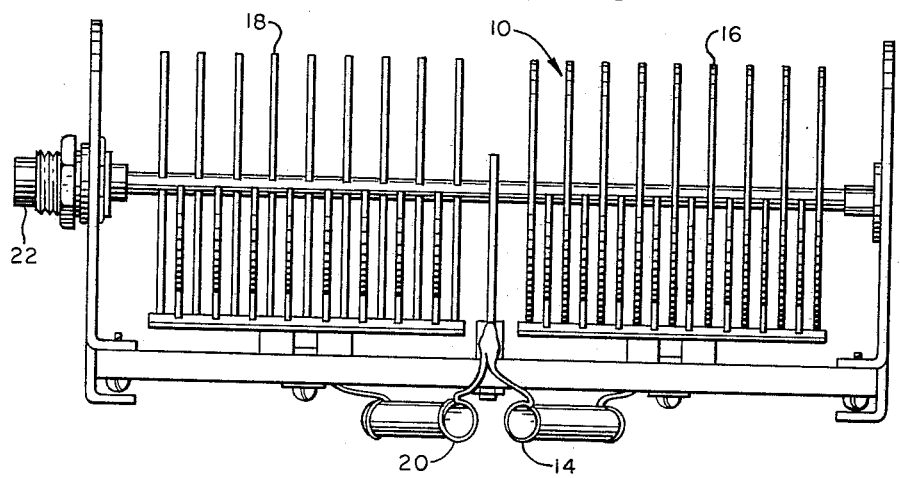
INVENTOR
JOHN A. CONNOR
BY
ATTORNEYS Sept. 20, 1955 J. A. CONNOR 2,718,617
ADJUSTABLE TEMPERATURE COEFFICIENT CAPACITOR
Filed May 17, 1951 2 Sheets-Sheet 2

INVENTOR
JOHN A. CONNOR

BY
ATTORNEY

United States Patent Office 2,718,617
Patented Sept. 20, 1955

2,718,617

ADJUSTABLE TEMPERATURE COEFFICIENT CAPACITOR

John A. Connor, Washington, D. C.

Application May 17, 1951, Serial No. 226,923

5 Claims. (Cl. 317—248)

(Granted under Title 35, U. S. Code (1952), sec. 266)

This invention relates to a novel variable temperature coefficient capacitor for use in stabilized inductance-capacitance circuits and in more particular to a capacitor having a wide range of adjustable temperature coefficients.

In radio-frequency circuits where a high degree of thermal stabilization is desirable, it has been the practice to use commercially available fixed capacitors with high-quality inductors to produce tuned inductance-capacitance circuits. These circuits have some degree of thermal stability provided care is taken in selecting a capacitor having the proper temperature coefficients. However, in those cases where a further refinement in frequency stabilization is desired or necessary, no practical solution has heretofore been found.

It is an object of the present invention to provide a novel capacitor for use with high-quality inductors to give a frequency stabilization which is greater than heretofore known.

It is a further object of this invention to provide a novel capacitor having a substantially constant total capacitance and adjustable temperature coefficient values over a wide range.

It is a further object of the present invention to provide a novel capacitor which has a substantially constant total capacitance and has a temperature coefficient range which is readily adjustable from positive to negative values or vice versa.

Referring now to the drawing wherein a preferred embodiment of the novel capacitor is shown:

Figure 1 is a schematic circuit diagram of the novel capacitor of the present invention connected to an oscillator.

Figure 2 is a side elevation of the novel capacitor.

Figure 3:
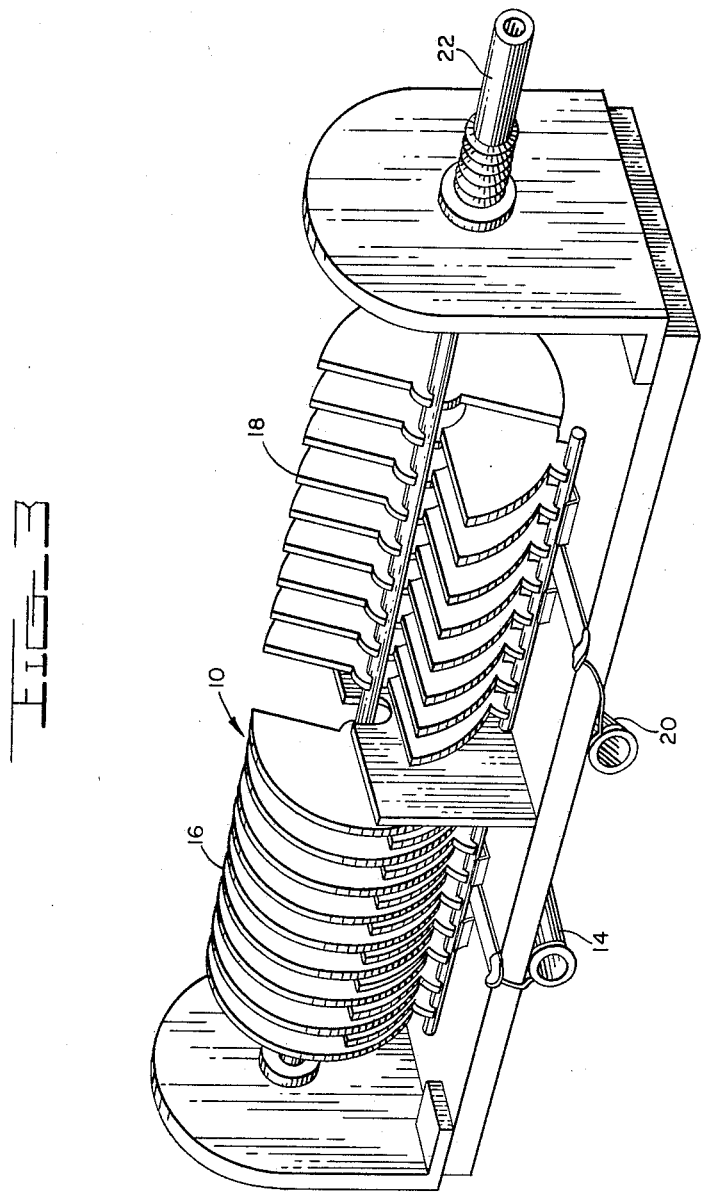
Figure 3 is a perspective view of the novel capacitor.

The novel capacitor constructed in accordance with the present invention is admirably suited for providing thermal stabilization of a free-running, self-excited oscillator. Since the free-running, self-excited oscillator is conventional and well-known, no further description of the oscillator is thought to be necessary.

The invention, in broad terms, contemplates a four-element combination of capacitor components connected in series-parallel and arranged in such a way as to provide an equivalent capacitor which will maintain a substantially constant total capacitance and provide an adjustable value of temperature coefficient. Preferably two of the capacitors are fixed and the other two are variable capacitors. This adjustable value of temperature coefficient will have its widest latitude when one of the fixed capacitors 14 or 20 has a large negative temperature coefficient value and the other fixed capacitor 14 or 20 has a large positive temperature coefficient value. The temperature coefficient value of the total circuit will be positive or negative depending upon the contribution to the total capacitance made by the variable capacitors 16 and 18 which are mechanically coupled together, so that, when they are varied in opposed directions with respect to each other in accordance with a predetermined law, the equivalent capacitance of the total circuits will remain constant, but the temperature coefficient of the combination will change.

For best results, a circuit has been selected where (1) $$C_x = C_y = C_1 = C_2 = C$$

where $C_x$ and $C_y$ are the nominal or mid-range values of capacitance for the respective variable capacitors and $C_1$ and $C_2$ are the capacitance values of the fixed capacitors.

Using these values, the condition for constant-equivalent circuit capacitance would be given by the equation:

(2) $$\Delta C_x = \frac{-\Delta C_y}{1 + \frac{\Delta C_y}{C}}$$

where $\Delta C_y$ = any change in $C_y$ made to change the equivalent temperature coefficient value, and $\Delta C_x$ = the corresponding change in $C_x$ necessary for a constant-capacitance condition Equation 2 defines the corresponding variation of one section of the variable condenser for any given variation of the other section required to maintain a constant total capacitance for the series-parallel capacitance network shown in Fig. 1. Equation 2 may be better understood by considering the following derivation thereof:

(3) $$C_T = \frac{C_1 C_x}{C_1 + C_x} + \frac{C_2 C_y}{C_2 + C_y}$$

where $C_T$ is the total circuit capacitance of Fig. 1. If the shaft of the variable condenser is rotated, the new value of $C_T$ will be:

(4) $$C_T + \Delta C_T = \frac{C_1(C_x + \Delta C_x)}{C_1 + C_x + \Delta C_x} + \frac{C_2(C_y + \Delta C_y)}{C_2 + C_y + \Delta C_y}$$

where $\Delta C_x$ and $\Delta C_y$ can even be large variations in $C_x$ and $C_y$ respectively.

Substituting (3) in (4):

(5) $$\Delta C_T = \frac{C_1(C_x + \Delta C_x)}{C_1 + C_x + \Delta C_x} + \frac{C_2(C_y + \Delta C_y)}{C_2 + C_y + \Delta C_y} - \frac{C_1 C_x}{C_1 + C_x} - \frac{C_2 C_y}{C_2 + C_y}$$

For $C_T$ to be held constant, $\Delta C_T$ must equal zero, so from Equation 5:

$$\frac{C_1(C_x + \Delta C_x)}{C_1 + C_x + \Delta C_x} + \frac{C_2(C_y + \Delta C_y)}{C_2 + C_y + \Delta C_y} = \frac{C_1 C_x}{C_1 + C_x} + \frac{C_2 C_y}{C_2 + C_y}$$

Substituting from Equation 1 for the case where the nominal value of the variable sections and the fixed condensers are all equal:

(6) $$\frac{C^2 + C\Delta C_x}{2C + \Delta C_x} + \frac{C^2 + C\Delta C_y}{2C + \Delta C_y} = C$$

or, solving for $\Delta C_x$, $$\Delta C_x = -\frac{\Delta C_y}{1 + \frac{\Delta C_y}{C}}$$

It follows that in order to obtain tracking between the two variable condenser sections that will maintain a constant total capacitance, one section may have a linear capacitance variation with shaft rotation but the other section must be designed with plates shaped in accordance with Equation 2. Therefore, employing any conventional means for achieving the desired capacity variation $$\Delta C_x = \frac{-\Delta C_y}{1 + \frac{\Delta C_y}{C}}$$

it is possible to accurately maintain the total capacitance of the two parallel arms precisely constant over an extremely large value of $\Delta C_x$ and $\Delta C_y$. Thus shaping the plates in accordance with the design consideration set forth in Equation 2 makes it possible to obtain large positive and negative values of temperature coefficient while maintaining accurately the initial, desired capacity value.

However, where certain variations in $C_T$ can be tolerated, a conventional split section variable capacitor, such as shown in the drawing, may be used. In this type of conventional capacitor, the change in capacity in the two sections would be equal. When $\Delta C_x$ and $\Delta C_y$ are small relative to C, the term in Equation 2 of $$\frac{\Delta C_y}{C}$$

may be ignored. The equation then reduces to:

$$\Delta C_x = -\Delta C_y$$

This simplification permits the construction of a variable temperature coefficient condenser whose total capacitance remains substantially constant through the use of a conventional 2 gang variable condenser with relatively simple changes as will be explained more fully below. If absolute constancy of capacitance is necessary then the plates must be shaped according to Equation 2 or other means must be used to cancel the small variation in total capacitance caused by the use of a conventional variable capacitor. A series capacitor $C_1$ is seen to contribute an effective temperature coefficient value in proportion to the ratio of the other capacitance $C_x$ to the sum of the capacitance $C_1+C_x$ in the series connection. For two capacitors in parallel, the temperature coefficient value of any element enters into the composite temperature coefficient value in proportion to the ratio of its capacitance to the total circuit capacitance. In the case where the four capacitor elements are equal in capacitance the nominal or mid-range temperature coefficient setting can be made equal to zero if the temperature coefficient value of the negative element $C_1$ equals the sum of the positive temperature coefficient values of the remaining three elements $C_x$, $C_y$ and $C_2$.

For the purposes of illustration, the novel capacitor 10 here described is coupled to a free-running, self-exciting oscillator 12. Capacitor 10, as shown in Figures 1 and 2, is made of four capacitors connected in series-parallel. One leg contains the fixed capacitor 14, Figure 2, which has a large negative temperature coefficient value. Also in this leg is the variable capacitor 16 which is coupled to and varied inversely with variable capacitor 18 which is connected in the other leg. In the same leg with variable capacitor 18 is connected a fixed capacitor 20 which has a large positive temperature coefficient value.

In order to obtain a negative temperature coefficient value, the capacitor 14 is preferably a solid dielectric of the ceramic type. The positive temperature coefficient value capacitors 16, 18 and 20 can be of the air-dielectric, mica, ceramic or glass type.

As shown in Figure 2, I prefer to make the variable coupled capacitors 16 and 18 of the air-dielectric type and fixed capacitors 14 and 20 of the ceramic type. Also, it should be noted that the variable capacitors are mounted so that their respective plates are 180 degrees out of phase. Therefore, upon rotation of shaft 22, the capacitance of capacitor 16 increases, while the capacitance of capacitor 18 decreases tending to keep the total capacitance of capacitor 10 constant and yet allowing for an adjustable temperature coefficient of capacitance. The embodiment shown in Fig. 3 is constructed to operate over limited values of $\Delta C_x$ and operates on the approximation upon which Equation 7 is based. With the respective plates of capacitors 16 and 18 being 180° out of phase, it should be obvious that an angular change $\theta$ of shaft 22 produces a capacity change in one capacitor equal and opposite to the change in the other capacitor. This follows from the fact that the capacity of this type of condenser varies directly as the amount of rotor plate area adjacent the stator plates and that the sector area of rotor plates adjacent the stator plates varies with $\theta$, the angle of rotation of shaft 22.

Thus it can be seen that capacitor 10 has a temperature coefficient variation which is adjustable to large positive and negative values and also can be adjusted to have a zero temperature coefficient of capacitance.

It should also be noted that the positive temperature coefficient capacitor 20 is used in one of the circuit legs to balance the capacitance of capacitor 14 which is in the other leg in order to achieve a substantially constant equivalent capacitance or "tracking" conditions by the use of similar type variable capacitors. However, it is within the scope of this invention to remove the capacitor 20 having a positive temperature coefficient from one of the circuit legs. If this is done, it is readily apparent that variable capacitor 18 would have to have a capacitance equal to the aggregate capacitance in the other leg, namely, that of the capacitors 14 and 16.

From the foregoing description of the present invention, it is apparent that considerable modification of the features thereof is possible without exceeding the scope of the invention which is defined in the appended claims.

The invention described herein may be manufactured and used by or for the Government of the United States of America for Governmental purposes without the payment of any royalties thereon or therefor.

What is claimed is:

1. A capacitor having an adjustable temperature coefficient while maintaining a constant capacity comprising in combination, two parallel capacitive circuit legs, the first of said legs including a capacitor having a negative temperature coefficient, the second of said legs including a capacitor having a positive temperature coefficient, and a pair of ganged variable capacitors, one of said pair of capacitors being serially connected in each of said legs, the respective plates of said pair of ganged capacitors being 180° out of phase so that as the capacitance of one capacitor increases the capacitance of the other capacitor decreases varying the total capacitance of each leg in opposite directions by substantially the same amount.

2. A capacitor having an adjustable temperature coefficient while maintaining a constant capacity comprising in combination, two parallel capacitive circuit legs, the first of said legs including a fixed capacitor having a negative temperature coefficient, the second of said legs including a capacitor having a positive temperature coefficient, and a pair of ganged variable capacitors whose respective plates are 180° out of phase, one of said pair of capacitors being connected in each of said legs to vary the total capacitance of each leg in opposite directions by substantially the same amount.

3. A capacitor having an adjustable temperature coefficient while maintaining a constant capacity comprising in combination, two parallel capacitive circuit legs, the first of said legs including a fixed capacitor having a negative temperature coefficient, the second of said legs including a variable capacitor having a positive temperature coefficient, and a second variable capacitor having a positive temperature coefficient serially connected to said fixed capacitor having a negative temperature coefficient, the variable capacitors having their respective plates 180° out of phase and being ganged together to vary the total capacitance of each leg in opposite directions by substantially the same amount.

4. A capacitor having an adjustable temperature coefficient while maintaining a constant capacity comprising in combination, two parallel capacitive circuit legs, the first of said legs including a fixed capacitor having a large negative temperature coefficient, the second of said legs including a fixed capacitor having a large positive temperature coefficient, and a variable capacitor having a positive temperature coefficient connected in each of said legs and ganged together so that the respective plates are 180° out of phase to vary the total capacitance of each leg in opposite directions by substantially the same amount.

5. A capacitor having an adjustable temperature coefficient while maintaining constant capacity comprising in combination, a pair of fixed capacitor elements of equal capacitance, one of said fixed elements having a positive temperature coefficient and the other having a negative temperature coefficient, a pair of variable capacitor elements ganged together so that one increases in capacity while the other decreases in capacity and vice versa, each of said variable elements having a positive temperature coefficient and a mid-range capacitance equal to that of said fixed elements, each of said fixed elements being connected in series with one of said variable elements to form a pair of series circuits each containing one fixed and one variable element, the relative capacitance variation rate of said variable capacitor elements being such that the total capacitance of said series circuit is varied in opposite directions by substantially the same amount, said pair of series circuits being connected in parallel to provide at their junction the output terminals for the variable temperature coefficient capacitor whereby a mid-range temperature coefficient setting equal to zero may be achieved when the negative temperature coefficient value of the one capacitor element equals the sum of the positive temperature coefficient values of the remaining three capacitor elements.

References Cited in the file of this patent

UNITED STATES PATENTS

| | | |
|---|---|---|
| 1,616,622 | Horton | Feb. 8, 1927 |
| 2,028,596 | Franklin | Jan. 21, 1936 |
| 2,231,389 | Koffyberg | Feb. 11, 1941 |
| 2,281,461 | Smith | Apr. 28, 1942 |

FOREIGN PATENTS

| | | |
|---|---|---|
| 105,090 | Australia | Sept. 6, 1938 |